UNITED STATES PATENT OFFICE.

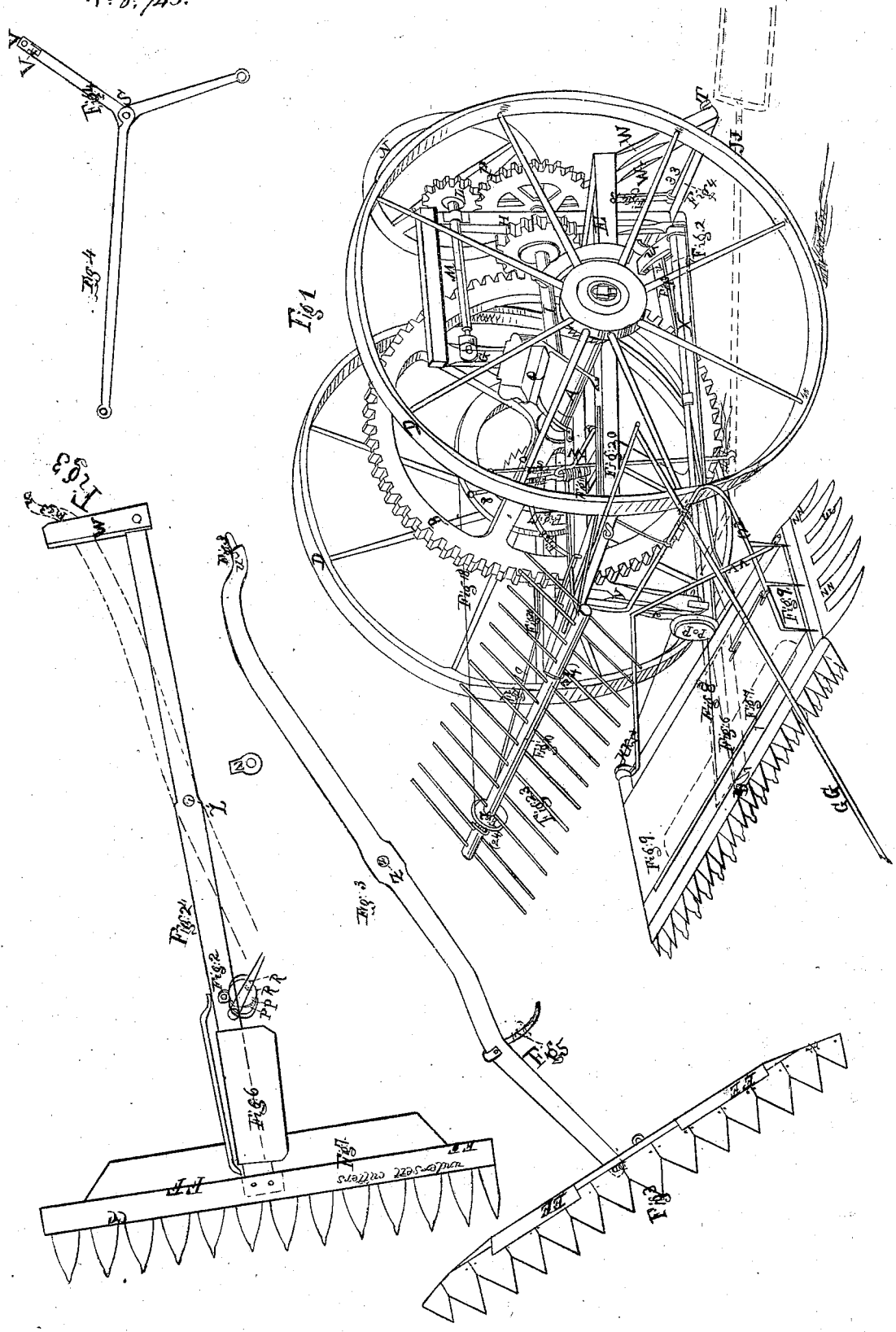

R. T. OSGOOD, OF ORLAND, MAINE.

IMPROVEMENT IN GRAIN AND GRASS HARVESTERS.

Specification forming part of Letters Patent No. 8,743, dated February 17, 1852.

*To all whom it may concern:*

Be it known that I, ROBERT T. OSGOOD, of Orland, in the county of Hancock and State of Maine, have invented a new and useful Improvement in Mowing and Reaping, which I call "Osgood's Mowing and Reaping Machine;" and I do hereby declare that the following is a full and clear description of the construction and operation of the same, reference being had to the annexed drawings, making a part of this specification, in which—

Figure 1 is a view of the whole machine for reaping, with both shafts or tongues attached for either one or two horses; Fig. 2, the under part of the cutters and arm; Fig. 3, the upper part of the cutters-arm upside down; Fig. 4, the toggle-joint, purchase, and sweep; Fig. 5, spring-latchet that plays under the pulley that carries the apron-cloth; Fig. 6, plate of iron or zinc secured to the under cutter-arm or shaft to prevent the grass passing between the arms, and for a support to the apron or plates that sustain the apron-cloth; Fig. 7, a plate of iron to elevate the cutters by a lever acting upon it, as in Fig. 8; Fig. 8, a lever or elevator; Fig. 9, apron-cloth; Fig. 10, top-gatherer to bring the grain to fall in its proper direction upon the apron; Fig. 11, lever-rake to throw the grain out, (in handfuls,) and also to prevent its sliding off the projecting arms N N, that extend beyond the roller or cloth.

To construct the machine, first make an axle-tree, A, of any required capacity to support the whole machine, about six feet long, with turned ends and bearings for the sides of the frame to hang into. Then place firmly a wheel with cogs B upon its face, five and a half feet in diameter, one foot to the right of the center; also, latchet or tooth wheels C at the inner shoulders of the axle for the carriage-wheels D, (which are to be made eighteen inches longer than the cog-wheel B,) and these ratchet-wheels are to set close to the hubs of the carriage which have a latch secured to them to play upon the teeth, so that when the carriage moves forward it moves the machinery, and when backward they slip over and serve only as carriage-wheels. Then make a frame of wood, E, about eight feet long, and wide enough to hang in the turned bearings, near the tooth-wheels under the axle-tree. This frame has a middle piece, F, like the sides, running the whole length of the frame, which has an upright or post, G, near the center, about four feet long, to support the forward ends of the speed and crank or balance wheel shafts. Then place another post or upright, H, the same height above and two and a half feet below the frame, and secure it well to the rear end of the frame, at the end of the middle piece that holds the first upright. Then place an iron shaft, I, with a small cog-wheel, J, one and a half feet in diameter, as near the frame as it will work, to match in the large cog-wheel B, and secure it by boxes in these uprights. Then add a larger cog-wheel, K, upon the rear end of this shaft for a speed-wheel to play into a smaller one, L, about one foot in diameter, placed upon the balance-wheel shaft M, and hung in the upper ends of these uprights, which have a top piece extending from one to the other and well secured. Then place a balance-wheel, N, of any required size and weight, upon the rear end of this shaft, with a pin, O, or band put in the arm P at any required distance from the center for the upper end of the toggle-joint, Fig. 4, sweep R, the lower end being secured to the middle joint, S, of the toggle-joint purchase, which has one end secured by a joint, T, to a post extending downward, (and outward,) W W, of the same distance as the middle post or upright, H, with the other end secured to the upper or vibrating arm, U, of the cutters, Fig. 3. This end has another joint, V, that works transversely with all the others to give the curve motion of the cutting-shaft, this joint being made as close to the end as possible, and made long and snug, so that it will keep its place. The end of the cutting-shaft, Fig. 3, attached to this, vibrates in a sliding frame, W, which is made fast to the other arm, and the arm secured by a joint or boxes to the middle hanging post, H, at the bottom, and at the inner end of the brace Z Z, that supports the lower ends of the two posts H and W W, with a rod, X, running the whole length of the machine-frame, and secured to another hanging post, Y, set in the forward part of the frame, there being an eye-bolt, Z, or rivet passing through the arms, Figs.

2 and 3, near the center, that receives this rod also, so that the cutters are hung in three places to the rod and posts under the frame, and they extend in front about four feet. The cutters work crosswise in front of the machine, the cutters B B being made of plates of steel secured to iron backs by means of stout screws or rivets C C, so as to leave a smooth surface for the cutting side, and the teeth being made sharp, like shears, with the cutting-edges playing close together, the upper set, Fig. 3, vibrating, being attached to the upper arm by a bolt, D D, and being bent over and made into a spring, and secured to the back of the cutter, Fig. 3, so that it passes through the arm and cutter, keeping the edges together by the arm bearing hardest on the teeth side, and the back E E being bent over the back of the under set, F F, (leaving vacant spaces for the arms to vibrate, &c.,) so that the arm, by means of the spring D D, forms a kind of lever to keep the teeth B B together, the under teeth being made in a kind of oval form, not so broad at the base as the upper, and have a point to serve as a guide before the iron, Fig. 7, (which is secured by joints to the under side of the cutters,) will take. The under part of these cutters is secured firmly to the end of the under arm crosswise, and the upper secured to the other by the spring-bolt D D aforesaid, which slides them hither and thither over the others, and keeps them close to the straight back of the under, the cutters being made of any required length, or about eight feet for common use, the teeth about eight inches long, the whole cutting transversely in front of the machine, the tongue G G, or shaft for the horses to draw upon, being attached to the front of the frame by eye-bolt-hinges I I, and extends to the left side sufficient for the horses to draw alongside of the standing grass or grain. I have also another shaft, J J, hung to the front hanging post, Y, underneath, and extending in the rear sufficient for a horse to travel. This shaft has a brake, Fig. 12, or lever attached to it, passing up through a piece of wood put across the frame underneath to serve as a guide for the machine, and to be used when the grass or grain is light. I then attach, for reaping, plates of iron running the whole length of the cutters, (with arms extending beyond on the left side,) with rollers at the ends to support a belt or apron-cloth, Fig. 9, to be kept in motion by means of a band, K K, passing over a pulley, L L, upon the end of the right roller O O, and also a pulley, P P, that is placed upon an iron upright, R R, well secured into the lower arm, Fig. 2, of the cutters, in front of the frame, and this pulley P P is kept in motion by a spring-latchet, Fig. 5, fastened to the upper arm of the cutters, and playing under the pulley upon a tooth-wheel, S S, upon the back of the pulley P P, so that when the machine is in motion this pulley P P will move always according to the speed or motion of the cutters, and is kept there by means of a latch or hand, T T, falling into the tooth-wheel S S, and secured above. Then secure a rod or piece of iron, V V, to the back of the apron-iron, Fig. 15, running up over the top of the aforesaid iron upright R R, sustaining the back of the apron, Fig. 15, the front side being held in its position by being secured to the back of the under cutters.

The arms N N extend about two feet beyond the roller or apron-cloth to the left to receive the grain as it is brought over by the apron-cloth, Fig. 9, which is continually moving to the left over these rollers; and it is kept upon these arms by a rake, Q Q, Fig. 11, or lever with teeth A A in it, so that when there is a sufficient quantity gathered the operator (whose position or seat Q is near or over the axle-tree) puts his foot upon the bend X X, near the other end of this rake or lever, which is kept in its proper position by a spiral spring, Y Y, under the same, and round about another brake or lever, through which this former lever-rake, Q Q, Fig. 11, passes, and is secured to the side of the frame. So by pressing down upon this spring Y Y it will raise the rake or tooth end A A, and by drawing back upon the upright lever, Fig. 16, it will throw the rake forward over the grain that is gathered upon the arms N N, and by thrusting it forward it will throw it back to its former position, with all the grain that it overreaches, out upon the ground. There is another pulley or wheel, Fig. 17, secured to the arms of the large cog-wheel B, about four feet in diameter, that carries the top-gatherer, as Fig. 10, by a band, Fig. 18. This is supported by two projecting arms, Fig. 19, secured to the front of the machine-frame by large headed screws, Fig. 20, passing through long mortises or holes, so that they can be projected forward to any required distance, and to tighten the band that passes over the pulley, Fig. 21, upon the top-gatherer, Fig. 10. This gatherer, being a shaft of wood the length of the cutters, with rods or arms, Fig. 23, passing through it, rests in hooks or boxes 24 at the ends of the projecting arms, Fig. 19, which are elevated to their proper position over the cutters by being bent upward.

All the above gear and works for reaping are so constructed that they can be readily removed when wanted for mowing, with one or the other of the horse-shafts G G or J J always off when in use, except where the rear one is wanted to draw it to the field of work, (being tied up to the rear post,) then both shafts G G and J J are to be hooked on if the if the other is wanted to work with.

The carriage-wheels D should be made of or hooped with jagged or rough iron, so as not to slip on the ground, and the whole machine to vary in size, larger or smaller, as the case may require for business.

What I claim as my invention, and desire to secure by Letters Patent, is—

The manner of placing the toggle-joint purchase, Fig. 4, (with the transverse acting joint V,) upon the end of the cutter-arm, Fig. 3, to act in conjunction with the other machinery, giving it, as it were, a double purchase by hanging the sweep so that the arm of the crank will be horizontal or parallel with the toggle-joint when straight, and giving the cutters their double motion by acting above and below this line. When the crank or hand O is up the purchase is at the upper end of the sweep; when half-way down it is at the lower end or joint, varying like a circular or screw power.

ROBERT T. OSGOOD.

Witnesses:
J. P. MASON,
A. PERRY.